United States Patent
Boyle

(10) Patent No.: US 8,799,007 B2
(45) Date of Patent: Aug. 5, 2014

(54) METHODS AND SYSTEMS FOR SUBSTANTIATION OF HEALTHCARE EXPENSES

(75) Inventor: Margaret A. Boyle, Wauwatosa, WI (US)

(73) Assignee: Metavante Corporation, Jacksonville, FL (US)

( * ) Notice: Subject to any disclaimer, the term of this patent is extended or adjusted under 35 U.S.C. 154(b) by 1579 days.

(21) Appl. No.: 11/551,559

(22) Filed: Oct. 20, 2006

(65) Prior Publication Data

US 2008/0097903 A1 Apr. 24, 2008

(51) Int. Cl.
*G06Q 10/00* (2012.01)
*G06Q 50/22* (2012.01)
*G06F 19/00* (2011.01)

(52) U.S. Cl.
CPC ............... *G06Q 10/00* (2013.01); *G06Q 50/22* (2013.01); *G06F 19/328* (2013.01)
USPC ............ 705/2; 705/3; 705/4; 705/39; 705/40; 235/379

(58) Field of Classification Search
CPC ............................ G06Q 50/22; G06F 19/328
USPC .......................................... 705/2, 3, 4, 39, 40
See application file for complete search history.

(56) References Cited

U.S. PATENT DOCUMENTS

| | | | |
|---|---|---|---|
| 7,197,468 B1* | 3/2007 | Patricelli et al. | 705/4 |
| 2002/0198831 A1* | 12/2002 | Patricelli et al. | 705/40 |
| 2004/0138999 A1* | 7/2004 | Friedman et al. | 705/39 |
| 2004/0249745 A1* | 12/2004 | Baaren | 705/39 |
| 2005/0261941 A1* | 11/2005 | Scarlat | 705/3 |
| 2006/0113376 A1* | 6/2006 | Reed et al. | 235/379 |
| 2006/0178915 A1* | 8/2006 | Chao | 705/4 |
| 2006/0212312 A1* | 9/2006 | Fotsch et al. | 705/2 |
| 2006/0212313 A1* | 9/2006 | Hoffman et al. | 705/2 |
| 2007/0168234 A1* | 7/2007 | Rutkowski et al. | 705/4 |

OTHER PUBLICATIONS

STIC-EIC 3600 search report, Mar. 26, 2014.*
Google scholar search, Mar. 18, 2014.*
PCT/US2007/082141, Written opinion of the international searching authority, Mar. 4, 2008.*

* cited by examiner

*Primary Examiner* — Dilek B Cobanoglu
(74) *Attorney, Agent, or Firm* — Finnegan, Henderson, Farabow, Garrett & Dunner, LLP

(57) ABSTRACT

Methods and systems are disclosed for processing a request to fund a purchase from a provider with a medical expense account. The request identifies expenses incurred with the purchase is received at a substantiation system and used to identify the provider. A determination is made whether the provider is included in a presubstantiation list, which identifies a set of providers determined to provide only goods and/or services eligible for funding by medical expense accounts. In response to a determination that the provider is included in the presubstantiation list, the expenses are automatically substantiated and substantiation information is generated and transmitted to a third-party administrator.

23 Claims, 3 Drawing Sheets

METHODS AND SYSTEMS FOR SUBSTANTIATION OF HEALTHCARE EXPENSES

BACKGROUND OF THE INVENTION

This application relates generally to medical spending accounts. More specifically, this application relates to the substantiation of healthcare expenses applied to medical spending accounts.

There are currently a variety of different types of medical spending accounts. These different accounts are managed in different ways and are generally used for different purposes, but have as a common factor that they permit funds earned through employment to be applied with certain income-tax advantages to pay for certain healthcare expenses. As used herein, "healthcare" expenses include a broad array of expenses that may arise in course of diagnosing, preventing, curing, or treating any disease that affects any part of function of the human body. They may include expenses related to teeth or other oral structures in the form of dental expenses, and may include expenses related to the eye and other ophthalmic structures in the form of vision expenses. Healthcare expenses may include service fees paid to physicians, dentists, optometrists, nurses, or other medical practitioners, service fees paid to laboratories that perform analyses of blood or other tissues, or that operate diagnostic equipment like x-ray machines, magnetic-resonance-imaging machines, and the like. Healthcare expenses may also include costs incurred to purchase, rent, or lease a variety of products used for healthcare. Some examples include hearing aids, crutches, prescription (and sometimes nonprescription) drugs, artificial limbs and other prosthetic devices, orthodontic braces and other appliances, service dogs, oxygen supplies, and so on. These examples are merely illustrative since there are many other examples of healthcare expenses.

Different types of medical spending accounts available for these types of expenses in the United States currently include flexible spending accounts ("FSAs"), health reimbursement accounts ("HRAs"), and health savings accounts ("HSAs"), and other types of medical spending accounts may be developed in the future. FSAs are financial accounts that are established as part of employer-sponsored benefits plans. Employees are able to contribute a set annual amount to the accounts, usually as part of a regular salary deduction that is applied to each paycheck. The employee is then able to spend the funds from the accounts to pay for healthcare expenses. Often the annual amount can be spent before the employee has completed making the contributions, permitting payment for healthcare expenses effectively to be made on an interest-free credit basis. Because contributions to the accounts are made as a salary reduction, they are also no subject to income tax.

HSAs are financial accounts that are intended to provide for payment of unreimbursed medical expenses incurred by those who are self-employed or employed by small organizations (fewer than 50 employees). One qualification requirement for such accounts is that the employee be covered by a high-deductible insurance plan. Funds in the account can be used on a pre-income-tax basis to pay for certain medical-insurance premiums and can earn tax-deferred interest. Unlike with FSAs, the funds in HSAs are available to be rolled over from year to year if they are unused.

HRAs are financial accounts having funds that are set aside by employers to provide reimbursement for employees who incur medical expenses. Like HSAs, the funds in the account can be rolled over from year to year, but they differ from HSAs not only in the fact that it is the employer who funds them rather than the employee, but also in that they have no restrictions on the size of the company where they are offered. The tax advantage for such accounts is enjoyed by the employers, who qualify for preferential tax treatment in a manner similar to employers who fund insurance plans.

When any of these medical spending accounts is used to support a healthcare expense, there may be requirements imposed to validate the expense. Such validation is referred to in the art as "substantiation" and is conventionally performed by a third-party administrator ("TPA"). To perform such conventional substantiation, the TPA reviews documentation that identifies the nature and amount of the expense. Such documentation usually specifies the provider of the service or goods and the specific nature of the service or goods. This permits an adjudication to be made whether the service or goods are eligible expenses as defined by the terms of the appropriate medical spending account.

Such a substantiation process is both time-consuming and generates a considerable amount of paperwork to be processed. There is accordingly a general need in the art for improved methods and systems for substantiation of healthcare expenses.

BRIEF SUMMARY OF THE INVENTION

Embodiments of the invention thus provide methods of processing a request to fund a purchase from a provider with a medical expense account. The request is received at a substantiation system. The request comprises an identification of expenses incurred with the purchase. The provider is identified from the received request. It is determined whether the provider is included in a presubstantiation list, which identifies a set of providers determined to provide only goods and/or services eligible for funding by medical expense accounts. In response to a determination that the provider is included in the presubstantiation list, the expenses are automatically substantiated and substantiation information is generated and transmitted to a third-party administrator.

Different embodiments permit different ways of identifying the provider associated with the received request. For example, in one embodiment, a provider identification string is extracted from the received request and the presubstantiation list comprises provider strings for the set of providers. Whether the provider is included in the presubstantiation list is then performed by determining whether the extracted provider string matches one of the provider identification strings comprised by the presubstantiation list. In another embodiment, name and address information of the provider is extracted from the received request and the presubstantiation list comprises name and address information for the set of providers. The determination of whether the provider is included in the presubstantiation list may then result from a determination whether the extracted name and address information matches the name and address information comprised by the presubstantiation list for one of the set of providers. In some instances, the extracted name and address information may not be identical to any of the name and address information comprised by the presubstantiation list, but is similar to that information for at least one of the providers in the list. In such instances, a return response may be transmitted to the request asking for clarification of the provider identity. When a second request is received providing the clarification, it may be used to identify the provider.

The invention also accommodates the use of different mechanisms for receiving the request. In one embodiment, the request is received as a card-transaction request from a point-of-sale device, with the card-transaction request including information extracted by the point-of-sale device from a card presented to support the purchase. In other embodiments, the request is received as a request over the Internet or as a request generated by a voice recognition unit.

If there is a determination that the provider is not included in the presubstantiation list, it may nevertheless be determined that the provider is included in a secondary list that identifies a second set of providers and identifies product-level information of goods and/or services eligible for funding by medical expense accounts. A specification of each of one or more products comprised by the purchase is then extracted and compared with the product-level information identified by the secondary list to determine which products comprised by the purchase are eligible for funding by the medical expense account. The portion of the expenses associated with the products determined to be eligible are substantiated, with substantiation information being generated and transmitted to a third-party administrator.

Methods of the invention may sometimes include comparing a balance of the medical expense account with a value of the substantiated portion of the expenses to adjudicate the request.

The methods of the invention may be embodied in a system having a communications device, a storage device, a processor, and a memory coupled with the processor. The presubstantiation list is stored on the storage device. The memory comprises a computer-readable medium having a computer-readable program embodied therein for directing operation of the system. The computer-readable program includes instructions for operating the system in accordance with the various embodiments described above.

BRIEF DESCRIPTION OF THE DRAWINGS

A further understanding of the nature and advantages of the present invention may be realized by reference to the remaining portions of the specification and the drawings wherein like reference numerals are used throughout the several drawings to refer to similar components. In some instances, a sublabel is associated with a reference numeral and follows a hyphen to denote one of multiple similar components. When reference is made to a reference numeral without specification to an existing sublabel, it is intended to refer to all such multiple similar components.

DETAILED DESCRIPTION OF THE INVENTION

Figure 1:
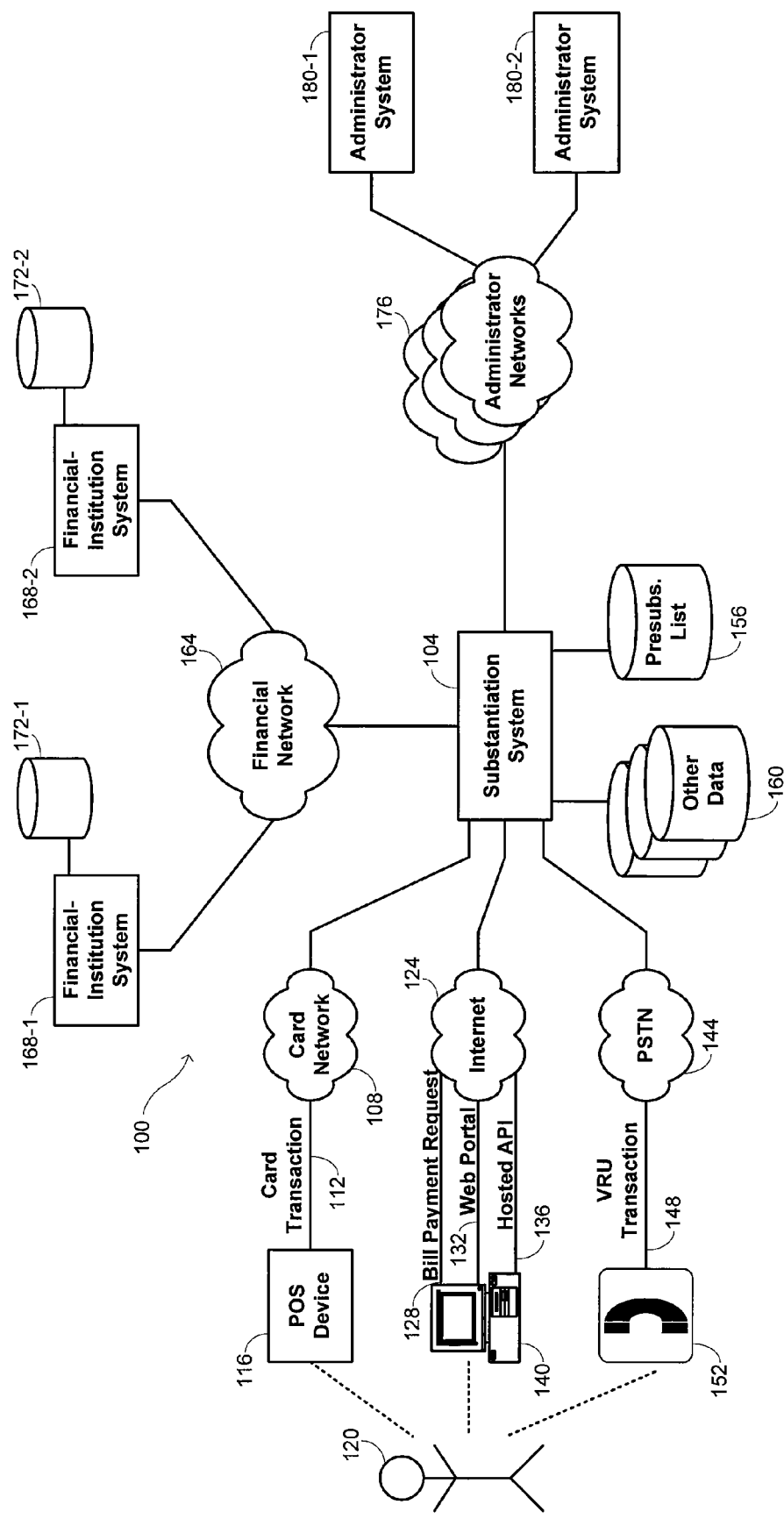
FIG. 1 is a schematic diagram illustrating an architecture within which methods of the invention may be performed.

Embodiments of the invention provide methods and systems for substantiation of healthcare expenses that are funded by a medical spending account. Substantiation may be achieved in an automated or semi-automated way in different embodiments. Specifically, a hierarchical scheme may be followed in a substantiation process that permits a certain category of expenses to be substantiated in a completely automated fashion based only on an identification of the provider. Those expenses that cannot be substantiated in that way may then be subjected to a semi-automated process that uses computational methods to individually assess the eligibility of each expense based on an identification of the nature of the expense. Expenses that cannot be substantiated in this semi-automated fashion may then be subjected to a manual substantiation process. One result of this substantiation hierarchy is a more effective allocation of resources in substantiating expenses, with manual substantiation being limited to those expenses that cannot be substantiated with the more efficient automated techniques.

At the highest level, automated substantiation can be performed by matching an identification of a provider with a list of presubstantiated providers. This list may be developed to apply to any medical expense account and reflects a determination that providers on the list offer only goods and services that are eligible expenses. Examples of such providers might include physicians who only provide eligible medical services, pharmacies that sell only eligible drugs, medical supply companies that sell only goods that are eligible as healthcare expenses, hospitals that provide both medical services and goods but all of which are eligible expenses, and the like. Offering of even a single good or service that is not eligible may be sufficient to exclude the provider from the presubstantiation list.

It is not necessary that such providers offer their goods at a physical location. For example, exclusively electronic and mail-order retailers, such as on-line pharmacies, may qualify for inclusion on the presubstantiation list if the goods they offer are all eligible healthcare expenses. In the same way, it is also possible in some instances for multiple providers to share a common location, with each of the providers at the common location being identified by their name or by some other indicator that is different from only their address. In some circumstances, some of the providers might be included on the presubstantiation list while others are omitted from it, depending on the types of goods and services that they offer. One example of such an arrangement is a hospital that includes a gift shop and a drug store. The hospital itself, the gift shop, and the drug store may each be identified as distinct providers. The hospital might be included on the presubstantiation list while the gift shop is excluded; the drug store might be included or excluded depending on the specific inventory that it maintains.

It is also possible in some embodiments for inclusion on the presubstantiation list to reflect compliance with a certification process. Such a certification process might include a review of a provider's inventory to ensure that no sales are made of noneligible goods. It might also include a mechanism for ensuring that inventory changes by the provider do not result in a change in that status, such as by requiring submission of an inventory-change proposal to a certification authority before effecting the change. In some instances, the certification authority might include a government agency, reflecting the fact that the tax advantage of the medical spending account is a result of a government policy. Participation in the certification process by providers may be motivated by the ability of the providers then to advertise their status as presubstantiated providers. The ability to advertise to potential customers that substantiation procedures will be greatly simplified when services or goods are purchased from a certified provider is expected to be attractive to providers.

There are a variety of different ways in which a presubstantiation list like that described above may be implemented within an architecture for processing healthcare expenses funded by a medical savings account. Such an architecture, one example of which is illustrated schematically in FIG. 1, may be configured to permit submission of expense claims in a variety of different ways. A structure of the presubstantiation list may thus advantageously permit identification of providers included in the list in different ways.

The architecture 100 shown in FIG. 1 is centered around a substantiation system 104, which may be provided as a computational system having programming to implement methods for processing healthcare expenses as described herein. The substantiation system 104 is provided with access to databases that include the presubstantiation list 156 and other data 160 that might be used in effecting methods of the invention. The substantiation system 104 is also provided in communication with one or more financial institutions 168 that may maintain the medical spending accounts. Data used in such activity by the financial institutions 168 may be maintained in respective data stores 172. Communications between the substantiation system 104 and the financial institutions 168 may take place in a number of different ways, with the drawing illustrating an embodiment in which a separate financial network 164 is provided for such communications. This network 164 may advantageously be provided in some embodiments as a private network to protect the security of the sensitive financial information being exchanged over it, and may use encryption protocols to enhance that security.

Communications with third-party administrators may similarly be effected through one or more administrator networks 176 that couple the substantiation system 104 and administrator systems 180. The administrator systems may be operated by TPAs to review information transmitted from the substantiation system and to respond to inquiries, particularly when performing a manual substantiation process on those expenses that are not amenable to automated substantiation.

Substantiation of healthcare expenses may be initiated using any of a variety of other interfaces with the substantiation system 104, some of which are shown explicitly in the drawing. For example, in some instances, a request may be transmitted from a party 120 to the substantiation system 104 over a card network 108. The party may be the provider or recipient of goods or services, depending on the specific implementation used. The use of a card network 108 is advantageous in those embodiments where the recipient has been issued a card that is used for identification. In different embodiments, the card network may comprise a public network or may comprise a private network. The card may comprise a magnetic-stripe card having identification information encoded magnetically on a magnetic-stripe, may comprise a "smart" card having identification information encoded on a chip within the card, or may comprise some other type of card. A card is an example of a more general class of presentation instruments that may be used, with such devices as key fobs, near-field communication-enabled wireless telephones, and the like alternatively being used in some embodiments as surrogates for the card.

To initiate a request in the form of a card transaction 112, the recipient presents the card so that the party can swipe it or otherwise provided it to a point-of-sale device 116, which extracts the identification information from the card. This information is combined with transaction information that may include an identification of the provider into a request that is transmitted from the point-of-sale device 116 to the substantiation system 104 over the card network. In this implementation, the provider identification may take the form of an alphanumeric provider identifier, although this is not necessary in all embodiments. As explained below, the substantiation system 104 may be configured to identify the provider from other types of information that are more commonly available with other transaction modalities; these same types of information may be used as an alternative basis for identification in the card-based implementations.

Other techniques for transmitting the request to the substantiation system 104 include transmission effected over a public network like the Internet 124. Because of the public nature of such a network 124, it is preferable that the data be secured during transmissions with the substantiation system 104. To initiate the request using such a mechanism, the party 120 may interact with a computational device 140 in any of a number of different ways. The drawing provides as examples the generation of a bill-payment request 128, the use of a web portal 132, and use of a hosted application programming interface ("API"). Any of these different mechanisms may be used to generate a request that is transmitted over the Internet 124 for substantiation of a healthcare expense.

These mechanisms may use information provided by the party 120 to include in the request to identify the provider, rather than using an automatically included provider identifier as is possible with the card transaction 112. Such information could be provided by the party 120 through completion of a fillable form, scanning of information from an invoice, or the like. Examples of the sort of information that may be included in the request that serve to identify the provider include its name, address, and the like.

Still another technique for generating a request to the substantiation system 104 uses the public switched telephone network ("PSTN") 144 in combination with voice-recognition-unit ("VRU") equipment to permit a party to generate the request over a telephone 152. The request is then generated as VRU transaction 148 having similar kinds of information for identifying the provider as might be used with requests transmitted over the Internet 124.

Figure 2:
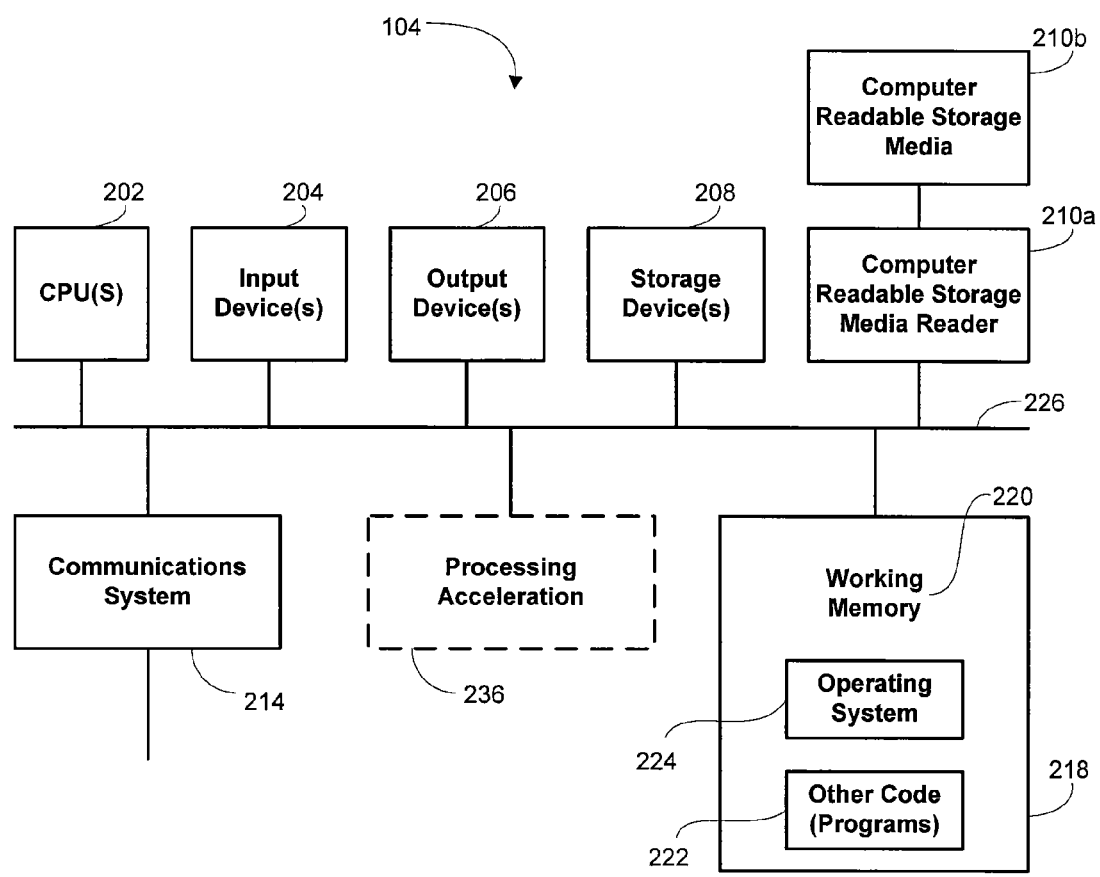
FIG. 2 is a schematic diagram of a computational device on which methods of the invention may be embodied.

FIG. 2 provides a schematic illustration of a physical structure that may be comprised by the benefit-records system 104 to implement embodiments of the invention. FIG. 2 broadly illustrates how individual system elements may be implemented in a separated or more integrated manner. The substantiations system 104 is shown comprised of hardware elements that are electrically coupled via bus 226, including a processor 202, an input device 204, an output device 206, a storage device 208, a computer-readable storage media reader 210a, a communications system 214, a processing acceleration unit 216 such as a DSP or special-purpose processor, and a memory 218. The computer-readable storage media reader 210a is further connected to a computer-readable storage medium 210b, the combination comprehensively representing remote, local, fixed, and/or removable storage devices plus storage media for temporarily and/or more permanently containing computer-readable information. The communications system 214 may comprise a wired, wireless, modem, and/or other type of interfacing connection and permits data to be exchanged over the architecture described in connection with FIG. 1.

The substantiations system 104 also comprises software elements, shown as being currently located within working memory 220, including an operating system 224 and other code 222, such as a program designed to implement methods of the invention. It will be apparent to those skilled in the art that substantial variations may be made in accordance with specific requirements. For example, customized hardware might also be used and/or particular elements might be implemented in hardware, software (including portable software, such as applets), or both. Further, connection to other computing devices such as network input/output devices may be employed.

Figure 3:
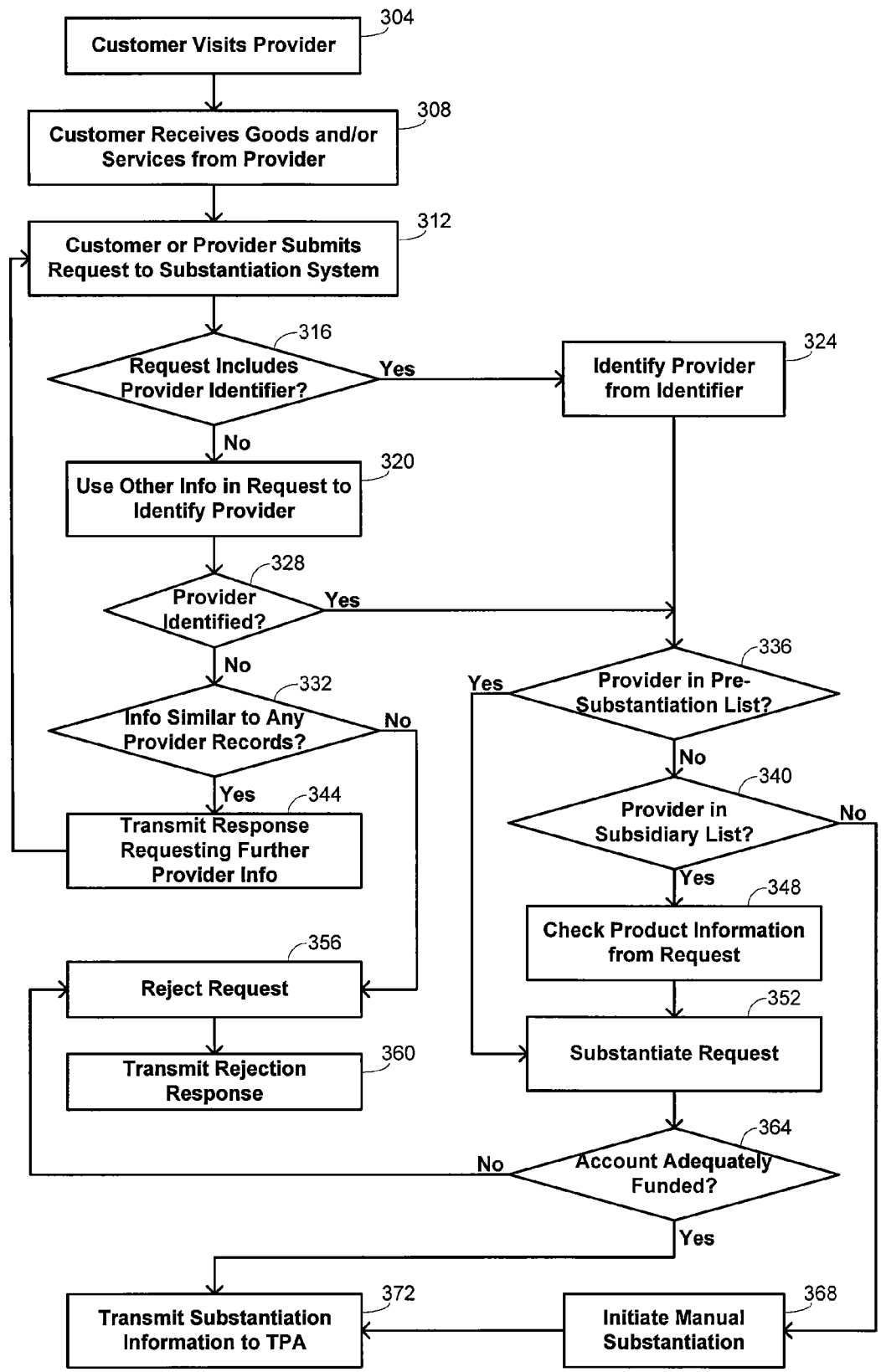
FIG. 3 is a flow diagram summarizing methods of substantiating healthcare expenses in accordance with several embodiments of the invention.

Methods by which healthcare expenses may be substantiated using the architecture of FIG. 1 are summarized for a number of different embodiments with the flow diagram of FIG. 3. Fundamentally, each request originates with a visit by a customer to a provider at block 304, where the visit may be a personal visit by the customer to a physical location or may be a virtual visit such as when the customer visits a web site maintained by the provider. The customer and provider interact so that the customer receives goods and/or services from the provider at block 308. As indicated at block 312, the customer or provider then generates and submits a request to the substantiation system 104. Such submittal may be performed using any of the mechanisms described above in connection with FIG. 1, among others.

Processing of the request by the substantiation system 104 thus begins at block 316 by determining whether the request includes a provider number or includes some other form of information that may be used to identify the provider. Generally, a provider number is expected when the request originated as a card transaction, while requests generated using other techniques are more likely to use other forms of information in identifying the provider. If a provider number is included, the provider is simply identified from that number at block 324. While such a method is generally more reliable for identifying a provider than using other information in the request as may be done at block 320, the ability to use alternative information in making the identifications increases the flexibility of the method. In some instances, an attempt to use other information included in the request may fail to identify the provider uniquely, as checked at block 328. For example, the name of the provider supplied in the request might vary slightly from the names of providers in the maintained by the substantiation system 104, the address information might differ, or there might be other differences of a similar nature. If the attempt fails in this way, but the provider information is similar to that of a provider contained in the records of the substantiation system 104, then supplementary efforts may be made to identify the provider. For instance, if the check at block 332 confirms that the records contain similar information, a response may be transmitted back at block 344 to request further identification information. If the substantiation system 104 is unable to identify the provider, the request may be rejected at block 356.

Identification of a provider, either directly from a provider identifier received as part of the request or indirectly from a comparison of other information extracted from the identifier, permits a check to be made against the presubstantiation list. If the provider is included in the presubstantiation list, as checked at block 336, then the request can be substantiated automatically at block 352. Inclusion of the provider in this list confirms that the provider offers no services or goods that are not eligible for application to a medical expense account. It is accordingly irrelevant in such a check what specific goods or services may have been purchased, permitting the substantiation to be processed more efficiently and quickly.

In some instances where the provider is not included in the presubstantiation list, it is still possible to avoid a manual substantiation if adequate product information is included in the request. Such product information may be specified using any of a variety of coding schemes that relate a code to a particular article of merchandise. Frequently, these coding schemes are intended to be used in generating optical codes like bar codes that can be affixed to articles, allowing information about the article to be obtained at a point of sale by scanning the bar code. A commonly used coding scheme is the Universal Product Code ("UPC") system, although other schemes like the European Article Number ("EAN") system, the Global Trade Item Number ("GTIN") system, the Serialized Shipping Container Code ("SSCC") system, the Global Location Number ("GLN") system, the Global Returnable Asset Identifier ("GRAI") system, the Global Individual Asset Identifier ("GIAI") system, and the Global Service Relation Number ("GSRN") system, may be used in alternative embodiments, among others. Many of these systems are currently administered by the Uniform Code Council, Inc. ("UCC") and EAN International. While the emphasis of the these organizations is currently on bar-code technologies, including Reduced Space Symbology ("RSS") and Composite Symbology ("CS"), they acknowledge that the systems may alternatively be implemented using other technologies, such as with radio-frequency tags. Embodiments of the invention are not restricted to any particular classification technology and are intended to encompass all such classification systems.

Accordingly, at block 340, a check is made whether the provider is included in a subsidiary list that includes an identification of specific product codes for eligible expenses. This might be done, for instance, by including a tabulation in the subsidiary list that defines substantiation rules for identifying services and goods that are eligible according to the relevant medical expense account. For example, suppose a provider is identified as a pharmacy that sells some pharmaceuticals that represent eligible expenses but also sells goods that are excluded from funding by the medical expense account. In this example, the tabulation in the subsidiary list would identify the UPC codes for the eligible pharmaceuticals for each of the providers.

Product information is extracted from the request at block 348, such as by extracting a corresponding UPC code for each of the goods and services purchased from the identified provider. To substantiate the request at block 352, a comparison is accordingly made between the product information extracted from the request and the eligible product information included in the subsidiary list. If there is a correspondence between the two, the expense associated with the verified product is substantiated. It will be appreciated that as a result of this comparison, there will be instances where a portion of a request is substantiated and a portion of the request is not.

Irrespective of whether a purely automatic substantiation is performed where the provider is included on the presubstantiation list as offering only eligible products or whether a semiautomatic substantiation is performed by separately verifying the eligibility of specific product expenses, there may be additional functions performed before the expense may be applied to the medical expense account. For example, a further function that may be performed is to verify that the medical expense account has sufficient funds to support the expenses that have otherwise been substantiated. Such a check is indicated in the drawing at block 364, with the request being rejected at block 356 if the medical expense account is not adequately funded. Otherwise, the substantiation information may be transmitted to the TPA at block 372.

In instances where the provider is not included in either the presubstantiation list or the subsidiary list, a conventional manual substantiation may be initiated at block 368 and substantiation information transmitted to the TPA at block 372. In some cases, a TPA may permit the payment to be made before the manual substantiation is completed. The manual substantiation requires transmittal of an invoice to the TPA, with reimbursement of the amount that was paid being expected if such documentation is not provided within a specific time period, often one month. If reimbursement is not made, collection procedures may be initiated and the ability to access the medical expense account may be restricted, either upon initiation of such collection procedures or upon their failure.

It is also noted that the existence of the presubstantiation list may also enable certain additional functionalities. For example, the list may be used for verification functions in which a check is made against the list to verify the inclusion of the provider. Such verification functions may be executed when different third-party administrators or employers are considering changes to benefits offerings. One factor in deciding on the implementation of different plans may be the ability to recommend providers who qualify for presubstantiation. The verification functions then play a relevant role in permitting such parties to confirm the status of different providers in making their decisions. Still other uses of the presubstantiation list under different circumstances will be evident to those of skill in the art after reading this disclosure.

Thus, having described several embodiments, it will be recognized by those of skill in the art that various modifications, alternative constructions, and equivalents may be used without departing from the spirit of the invention. Accordingly, the above description should not be taken as limiting the scope of the invention, which is defined in the following claims.

What is claimed is:

1. A method of processing a request to fund a purchase from a provider with a medical expense account, the method comprising:
   receiving a request at a substantiation system, the request comprising an identification of expenses incurred with the purchase;
   identifying, using a processor, a provider from the received request with the substantiation system;
   determining, using the processor, whether the provider is included in a presubstantiation list with the substantiation system, the presubstantiation list comprising at least one provider that provides only goods or services eligible for funding by medical expense accounts; and
   in response to a determination that the provider is included in the presubstantiation list,
      automatically substantiating the expenses with the substantiation system based on the provider's inclusion in the presubstantiation list;
      generating substantiation information with the substantiation system; and
      transmitting the generated substantiation information from the substantiation system to a third-party administrator, and
   in response to a determination that the provider is not included in the presubstantiation list, determining, using the processor, that the provider is included in a secondary list with the substantiation system, the secondary list identifying eligible goods or services.

2. The method recited in claim 1 wherein:
   identifying the provider from the received request comprises extracting a provider identification string from the received request;
   the presubstantiation list comprises provider identification strings for the set of providers; and
   determining whether the provider is included in the presubstantiation list comprises determining whether the extracted provider identification string matches one of the provider identification strings comprised by the presubstantiation list.

3. The method recited in claim 1 wherein:
   identifying the provider from the received request comprises extracting name and address information of the provider from the received request;
   the presubstantiation list comprises name and address information for the set of providers; and
   determining whether the provider is included in the presubstantiation list comprises determining whether the extracted name and address information matches the name and address information comprised by the presubstantiation list for one of the set providers.

4. The method recited in claim 3 wherein the extracted name and address information is not identical to any of the name and address information comprised by the presubstantiation list but is similar to the name and address information comprised by the presubstantiation list for at least one of the set providers, the method further comprising:
   transmitting a return response to the request asking for clarification of the provider identity; and
   receiving a second request at the substantiation system, the second request providing the clarification,
   wherein identifying the provider comprises identifying the provider from the clarification in the second request.

5. The method recited in claim 1 wherein receiving the request comprises receiving a card-transaction request from a point-of-sale device, the card-transaction request including information extracted by the point-of-sale device from a card presented to support the purchase.

6. The method recited in claim 1 wherein receiving the request comprises receiving the request over the Internet.

7. The method recited in claim 1 wherein receiving the request comprises receiving a request generated by a voice recognition unit.

8. The method recited in claim 1 further comprising, in response to a determination that the provider is included in the secondary list, the secondary list identifying at least one provider and product-level information of goods or services eligible for funding by medical expense accounts:
   extracting a specification of each of one or more products comprised by the purchase from the received request;
   comparing the extracted specification with the product-level information identified by the secondary list to determine which products comprised by the purchase are eligible for funding by medical expense accounts;
   substantiating the portion of the expenses associated with the products determined to be eligible for funding by medical expense accounts;
   generating substantiation information with the substantiation system; and transmitting the generated substantiation information from the substantiation system to a third-party administrator.

9. The method recited in claim 8 further comprising comparing a balance of the medical expense account with a value of the substantiated portion of the expenses to adjudicate the request.

10. The method recited in claim 1 further comprising comparing a balance of the medical expense account with a value of the expenses to adjudicate the request.

11. The method recited in claim 1 wherein the medical expense account is a flexible spending account ("FSA").

12. The method recited in claim 1 wherein the medical expense account is a health reimbursement account ("HRA").

13. The method recited in claim 1 wherein the medical expense account is a health savings account ("HSA").

14. A system for processing a request to fund a purchase from a provider with a medical expense account, the system comprising:
   a communications system;
   a storage device, the storage device maintaining a presubstantiation list comprising at least one provider that provides only goods or services eligible for funding by medical expense accounts and a secondary list identifying eligible goods or services;
   a processor in communication with the communications system and with the storage device; and a memory coupled with the processor, the memory comprising a computer-readable medium having a computer-readable program embodied therein for directing operation of the system, the computer-readable program including:

instructions for receiving the request with the communications system, the request comprising an identification of expenses incurred with the purchase;

instructions for identifying the provider from the received request with the processor;

instructions for determining whether the provider is included in the presubstantiation list with the processor;

instructions for automatically substantiating the expenses with the processor based on the provider's inclusion in the presubstantiation list;

instructions for generating substantiation information with the processor;

instructions for transmitting the generated substantiation information from the system to a third-party administrator with the communications system; and instructions for determining that the provider is included in the secondary list with the processor, wherein the instructions for automatically substantiating the expenses, for generating substantiation information, and for transmitting the generated substantiation information are to be executed in response to a determination that the provider is included in the presubstantiation list; and wherein the instructions for determining that the provider is included in the secondary list is to be executed in response to a determination that the provider is not included in the presubstantiation list.

15. The system recited in claim 14 wherein:
the instructions for identifying the provider from the received request comprise instructions for extracting a provider identification string from the received request;
the presubstantiation list comprises provider identification strings for the set of providers; and
the instructions for determining whether the provider is included in the presubstantiation list comprise instructions for determining whether the extracted provider string matches one of the provider identification strings comprised by the presubstantiation list.

16. The system recited claim 14 wherein:
the instructions for identifying the provider from the received request comprise instructions for extracting name and address information of the provider from the received request;
the presubstantiation list comprises name and address information for the set of providers; and
the instructions for determining whether the provider is included in the presubstantiation list comprise instructions for determining whether the extracted name and address information matches the name and address information comprised by the presubstantiation list for one of the set of providers.

17. The system recited in claim 16 wherein the extracted name and address information is not identical to any of the name and address information comprised by the presubstantiation list but is similar to the name and address information comprised by the presubstantiation list for at least one of the set of providers, the computer-readable program further comprising:

instructions for transmitting a return response to the request asking for clarification of the provider identity with the communications system; and instructions for receiving a second request with the communications system, the second request providing the clarification, wherein the instructions for identifying the provider comprise instructions for identifying the provider from the clarification in the second request.

18. The system recited in claim 14 wherein the instructions for receiving the request comprise instructions for receiving a card-transaction request from a point-of-sale device, the card-transaction request including information extracted by the point-of-sale device from a card presented to support the purchase.

19. The system recited in claim 14 wherein the instructions for receiving the request comprise instructions for receiving the request over the Internet.

20. The system recited in claim 14 wherein the instructions for receiving the request comprise instructions for receiving a request generated by a voice recognition unit.

21. The system recited in claim 14 wherein:
the secondary list identifies a second set of providers and identifies product-level information of goods or services eligible for funding by medical expense accounts; and
the computer-readable program further includes:
instructions for extracting a specification of each of one or more products comprised by the purchase from the received request with the processor;
instructions for comparing the extracted specification with the product-level information identified by the secondary list to determine which products comprised by the purchase are eligible for funding by medical expense accounts with the processor; and
instructions for substantiating the portion of the expenses associated with the products determined to be eligible for funding by medical expense accounts with the processor, wherein the instructions for extracting the specification of each of one or more products comprised by the purchase from the received request, for comparing the extracted specification with the product-level information, for substantiating the portion of the expenses, for generating substantiation information, and for transmitting the generated substantiation information are to be executed in response to a determination that the provider is not included in the presubstantiation list.

22. The system recited in claim 21 wherein the computer-readable program further comprises instructions for comparing a balance of the medical expense account with a value of the substantiated portion of the expenses to adjudicate the request with the processor.

23. The system recited in claim 14 wherein the computer-readable program further comprises instructions for comparing a balance of the medical expense account with a value of the expenses to adjudicate the request.

* * * * *